United States Patent
Zhang et al.

(10) Patent No.: US 11,467,443 B2
(45) Date of Patent: Oct. 11, 2022

(54) POLARIZER AND PREPARATION METHOD THEREOF AND DISPLAY DEVICE

(71) Applicants: Beijing BOE Display Technology Co., Ltd., Beijing (CN); BOE Technology Group Co., Ltd., Beijing (CN)

(72) Inventors: Yu Zhang, Beijing (CN); Guangyun Tong, Beijing (CN); Zhuolong Li, Beijing (CN); Mingzhe Ye, Beijing (CN); Bochang Wang, Beijing (CN)

(73) Assignees: Beijing BOE Display Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/229,917

(22) Filed: Apr. 14, 2021

(65) Prior Publication Data
US 2022/0100017 A1 Mar. 31, 2022

(30) Foreign Application Priority Data
Sep. 28, 2020 (CN) .......................... 202011040583.2

(51) Int. Cl.
*G02F 1/1335* (2006.01)
*G02B 5/30* (2006.01)

(52) U.S. Cl.
CPC ..... *G02F 1/133528* (2013.01); *G02B 5/3058* (2013.01); *G02F 2202/36* (2013.01)

(58) Field of Classification Search
CPC ......... G02F 1/133528; G02F 1/133504; G02F 2203/04; G02F 1/01791; G02F 1/133533; G02F 1/0139; G02F 2202/36; G02F 2203/03; G02B 5/3025; G02B 5/3033; G02B 5/3058; G02B 5/30
See application file for complete search history.

(56) References Cited

U.S. PATENT DOCUMENTS

2013/0301130 A1* 11/2013 Nakamura ........ G02F 1/133606
 359/493.01
2017/0227815 A1* 8/2017 Xie ................... G02F 1/133308

* cited by examiner

*Primary Examiner* — Jia X Pan
(74) *Attorney, Agent, or Firm* — ArentFox Schiff LLP; Michael Fainberg

(57) ABSTRACT

The present application discloses a polarizer and a preparation method thereof and a display device. Embodiments of the present disclosure provides a polarizer, wherein the polarizer includes: a polarizing layer, and a depolarizing layer located on a light emitting side of the polarizing layer; the depolarizing layer includes: nanoparticles, and a reflective part covering the nanoparticles; and the reflective part covering the nanoparticles generates resonance scattering with incident light.

15 Claims, 4 Drawing Sheets

POLARIZER AND PREPARATION METHOD THEREOF AND DISPLAY DEVICE

CROSS REFERENCE TO RELATED APPLICATIONS

The present application claims the priority of the Chinese patent application No. 202011040583.2 filed on Sep. 28, 2020 to the China Patent Office, the entire contents of which are incorporated herein by reference.

FIELD

The present disclosure relates to the technical field of display, and particularly to a polarizer and a preparation method thereof and a display device.

BACKGROUND

Liquid Crystal Displays (LCDs) are of great interest in the industry due to their advantages of small size, low power consumption, no radiation, etc. and are now widely used in the fields of mobile phones, vehicles, displays, televisions, public displays, etc.

A traditional LCD includes a backlight source and a display screen, wherein the display screen is mainly composed of an upper polarizer, a color film, a liquid crystal, a thin film transistor, and a lower polarizer. The optical axes of the upper and lower polarizers are distributed vertically at 90°. The polarization degree of light is controlled by a liquid crystal switch to realize the display function. The light emitted by the backlight source is mainly natural light, which is filtered by the lower polarizer into linearly polarized light in the vertical direction, and enters the liquid crystal; the polarization direction of the light is changed by the birefringence of the liquid crystal, and then the light emitted through the upper polarizer is still linearly polarized light. The linear polarization degree of the light emitted by the display screen can reach 99.8%. However, linearly polarized light is more likely to cause eye fatigue. At present, the display industry has developed a liquid crystal display technique of a circular polarizer, which aims to convert linearly polarized light into circularly polarized light. This solution requires the use of a Quarter-Wave Plate (QWP). However, the optical rotation efficiency of the QWP for different wave bands is different, and the brightness through the QWP at different angles is significantly reduced, which is likely to cause color shift and affects the display effect.

SUMMARY

Embodiments of the present disclosure provide a polarizer and a preparation method thereof and a display device, so as to realize healthy display and avoid display color shift.

Embodiments of the present disclosure provide a polarizer, wherein the polarizer includes: a polarizing layer, and a depolarizing layer on a light emitting side of the polarizing layer; the depolarizing layer includes: nanoparticles, and a reflective part covering the nanoparticles; the reflective part covering the nanoparticles generates resonance scattering with incident light.

In some embodiments, the depolarizing layer further includes: a glue material; and the nanoparticles covered by the reflective part are dispersed in the glue material.

In some embodiments, the depolarizing layer further includes: a light-transmitting support layer; and the glue material is on a side, facing away from the polarizing layer, of the light-transmitting support layer.

In some embodiments, the depolarizing layer further includes: a light-transmitting support layer; the polarizing layer is multiplexed as the light-transmitting support layer, and the glue material is on the light emitting side of the polarizing layer.

In some embodiments, the glue material includes optical glue.

In some embodiments, a material of the nanoparticles includes silicon; and a material of the reflective part includes: silver.

In some embodiments, the nanoparticles in the depolarizing layer are provided with a plurality of particle sizes; and the reflective part covering the nanoparticles with different particle sizes among the plurality of particle sizes respectively generates resonance scattering with light of different preset wavelength ranges.

In some embodiments, the depolarizing layer at least includes: a first nanoparticle, a second nanoparticle and a third nanoparticle; the diameter of the first nanoparticle is greater than a diameter of the second nanoparticle, and the diameter of the second nanoparticle is greater than a diameter of the third nanoparticle; a thickness of the reflective part covering the third nanoparticle is greater than a thickness of the reflective part covering the second nanoparticle; the thickness of the reflective part covering the second nanoparticle is greater than a thickness of the reflective part covering the first nanoparticle; the reflective part covering the first nanoparticle generates resonance scattering with red light; the reflective part covering the second nanoparticle generates resonance scattering with green light; and the reflective part covering the third nanoparticle generates resonance scattering with blue light.

In some embodiments, a particle size of the first nanoparticle is: 33 nanometers to 35 nanometers; the thickness of the reflective part covering the second nanoparticle is: 10 nanometers to 12 nanometers; a particle size of the second nanoparticle is: 21 nanometers to 23 nanometers; the thickness of the reflective part covering the second nanoparticle is: 14 nanometers to 17 nanometers; a particle size of the third nanoparticle is: 1 nanometer to 2 nanometers; the thickness of the reflective part covering the third nanoparticle is: 29 nanometers to 32 nanometers.

In some embodiments, the polarizer further includes: a first protective layer and a second protective layer; the first protective layer is on a side, facing away from the depolarizing layer, of the polarizing layer; the second protective layer is on a side, facing away from the polarizing layer, of the depolarizing layer.

An embodiment of the present disclosure provides a preparation method of a polarizer, including: providing a polarizing layer; and forming a depolarizing layer on a light emitting side of the polarizing layer, the depolarizing layer includes: nanoparticles, and a reflective part covering the nanoparticles; the reflective part covering the nanoparticles generates resonance scattering with incident light.

In some embodiments, forming the depolarizing layer on the light emitting side of the polarizing layer specifically includes: providing a light-transmitting support layer; providing optical glue added with the nanoparticles covered by the reflective part, and coating the optical glue on a side, facing away from the polarizing layer, of the light-transmitting support layer; and attaching a side of the light-transmitting support layer uncoated with the optical glue to the polarizing layer.

In some embodiments, forming the depolarizing layer specifically includes: providing the optical glue added with the nanoparticles covered by the reflective part; using the polarizing layer as the light-transmitting support layer, and coating a side of the polarizing layer with optical glue.

An embodiment of the present disclosure provides a display device, including: a liquid crystal display panel, and a polarizer located on a light emitting side of the liquid crystal display panel according to an embodiment of the present disclosure; the depolarizing layer in the polarizer is on a side, facing away from the liquid crystal display panel, of the polarizing layer.

In some embodiments, the display device further includes polarized glasses.

BRIEF DESCRIPTION OF THE DRAWINGS

In order to more clearly explain the technical solutions in the embodiments of the present disclosure, the accompanying drawings to be used in the description of the embodiments will be briefly introduced below. Obviously, the accompanying drawings in the following description are only some embodiments of the present disclosure. For a person of ordinary skill in the art, other accompanying drawings can be obtained according to these accompanying drawings without involving inventive work.

DETAILED DESCRIPTION OF THE EMBODIMENTS

In order to make the purpose, technical solutions and advantages of the embodiments of the present disclosure clearer, the technical solutions of the embodiments of the present disclosure will be described clearly and completely in conjunction with the accompanying drawings of the embodiments of the present disclosure. Obviously, the described embodiments are part of the embodiments of the present disclosure, but not all the embodiments. And in the case of no conflict, the embodiments in the present application and the features in the embodiments may be combined with each other. On the basis of the described embodiments of the present disclosure, all other embodiments obtained by a person of ordinary skill in the art without inventive work fall within the protection scope of the present disclosure.

Unless otherwise defined, the technical or scientific terms used in the present disclosure shall have the usual meanings understood by a person of ordinary skill in the art to which the present disclosure belongs. "First", "second" and other similar words used in the present disclosure do not indicate any order, quantity or importance, but are only used to distinguish different components. "Including" or "comprising" or other similar words mean that an element or an item preceding the word includes an element or item and the equivalent thereof listed after the word, without excluding other elements or items. "Connection" or "coupling" or other similar words are not restricted to physical or mechanical connection, but may include electrical connection, whether direct or indirect.

It should be noted that the size and shape of each figure in the accompanying drawings do not reflect the true ratio, and the purpose is only to illustrate contents of the present disclosure. In addition, the same or similar reference signs indicate the same or similar elements or elements having the same or similar functions throughout.

Figure 1:
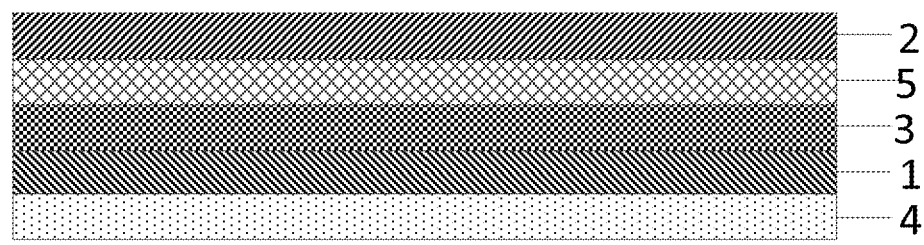
FIG. 1 is a schematic structural diagram of a polarizer according to an embodiment of the present disclosure.

Embodiments of the present disclosure provide a polarizer, as shown in FIG. 1, including: a polarizing layer 3, and a depolarizing layer 5 located on a light emitting side of the polarizing layer 3.

Figure 2:
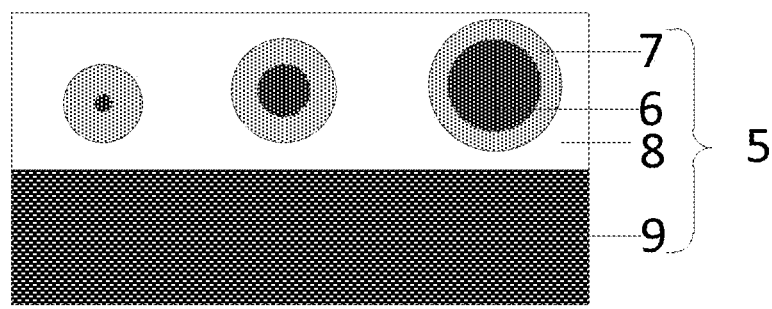
FIG. 2 is a schematic structural diagram of another polarizer according to an embodiment of the present disclosure.

As shown in FIG. 2, the depolarizing layer 5 includes: nanoparticles 6, and a reflective part 7 covering the nanoparticles 6.

The reflective part 7 covering the nanoparticles 6 generates resonance scattering with incident light.

The polarizer according to the embodiments of the present disclosure includes the depolarizing layer, and the depolarizing layer includes nanoparticles covered by the reflective part. The nanoparticles can absorb light waves. When a photon frequency matches a natural oscillation frequency of electrons on a surface of the reflective part, plasma resonance will occur on the surface of the reflective part, resonance effect is generated, and resonance scattering occurs, so that polarized light can be depolarized to form near-natural light. Thus, a linear polarization degree of the light emitted from the polarizer is low.

When the polarizer according to the embodiments of the present disclosure is applied to a display product and used as an upper polarizer of the display product, the linear polarization degree of the light emitted from the display product is low, and eye fatigue is not easily caused. In addition, according to the polarizer provided by embodiments of the present disclosure, since the linearly polarized light can be depolarized to form natural light, when the polarizer is applied to sunglasses for visual display, display color shift will not occur.

In the polarizer provided by the embodiments of the present disclosure, the nanoparticles covered by the reflective part may be particles with a core-shell structure.

In some embodiments, as shown in FIG. 2, the depolarizing layer 5 further includes: a glue material 8; and the nanoparticles 6 covered by the reflective part 7 are dispersed in the glue material 8.

That is to say, the nanoparticles covered by the reflective part are dissolved in the glue material and mixed evenly with the glue material.

In some embodiments, as shown in FIG. 1, the polarizer further includes: a first protective layer 1 located on a side, facing away from the depolarizing layer 5, of the polarizing layer 3, a pressure-sensitive adhesive 4 located on a side, facing away from the polarizing layer 3, of the first protective layer 1, and a second protective layer 2 located on a side, facing away from the polarizing layer 3, of the depolarizing layer 5.

In some embodiments, as shown in FIG. 2, the depolarizing layer 5 further includes: a light-transmitting support layer 9.

It should be noted that the nanoparticles covered by the reflective part are solid, and the uncoated glue material is liquid. After the nanoparticles are dissolved in the glue material, an obtained material is still liquid. Therefore, the liquid material needs to be coated on the light-transmitting support layer to form a film layer with a depolarizing function.

Figure 3:
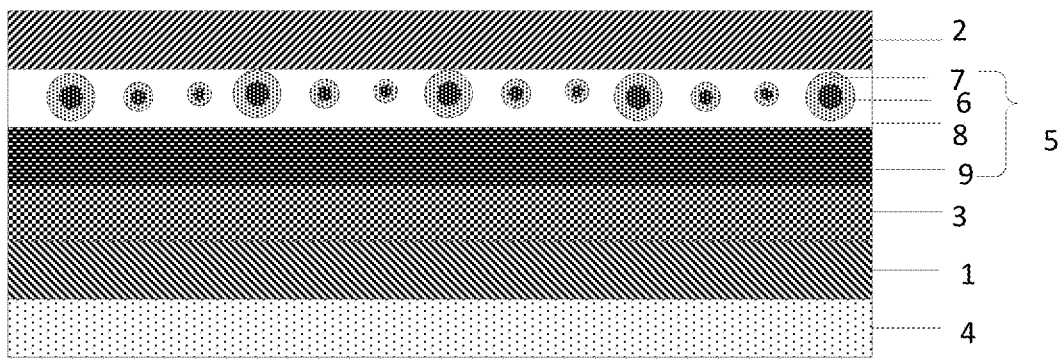
FIG. 3 is a schematic structural diagram of still another polarizer according to an embodiment of the present disclosure.

In some embodiments, as shown in FIG. 3, the glue material 8 is on a side, facing away from the polarizing layer 3, of the light-transmitting support layer 9. That is to say, the glue material 8 is between the light-transmitting support layer 9 and the second protective layer 2.

Figure 4:
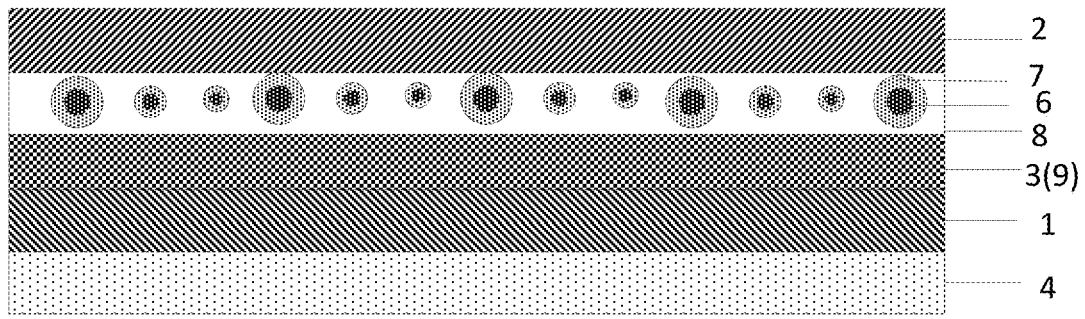
FIG. 4 is a schematic structural diagram of still another polarizer according to an embodiment of the present disclosure.

Alternatively, in some embodiments, as shown in FIG. 4, the polarizing layer 3 is multiplexed as the light-transmitting support layer 9, and the glue material 8 is on a light emitting side of the polarizing layer 3. That is to say, the glue material 8 is between the polarizing layer 3 and the second protective layer 2.

According to the polarizer provided by the embodiments of the present disclosure, the polarizing layer is multiplexed as a light-transmitting support layer, so that a structure of the polarizer can be simplified, a preparation process of the polarizer can be simplified, and the cost can be saved. A thickness of the polarizer may also be reduced.

In some embodiments, a material of the first protective layer includes one of: polyethylene terephthalate (PET), acrylic, cyclo olefin polymer (COP) and triacetyl cellulose (TAC).

In some embodiments, a material of the second protective layer includes one of: PET, acrylic, COP and TAC.

In specific implementation, the materials of the first protective layer and the second protective layer may be the same or different. When the materials of the first protective layer and the second protective layer are the same, the materials of the first protective layer and the second protective layer may be any one of PET, acrylic, COP and TAC. When the materials of the first protective layer and the second protective layer are different, the materials of the first protective layer and the second protective layer may be any two of PET, acrylic, COP and TAC.

In some embodiments, a material of the light-transmitting support layer can be selected from the same material as the second protective layer, that is, the material of the light-transmitting support layer includes one of: PET, acrylic, COP and TAC.

In some embodiments, when the polarizer includes the second protective layer and the light-transmitting support layer, the materials of the light-transmitting protective layer and the second protective layer may be the same or different.

In specific implementation, when the materials of the light-transmitting support layer and the second protective layer are the same, the materials of the light-transmitting support layer and the second protective layer may be any one of PET, acrylic, COP and TAC. When the materials of the light-transmitting support layer and the second protective layer are different, the materials of the light-transmitting support layer and the second protective layer may be any two of PET, acrylic, COP and TAC.

In some embodiments, the material of the polarizing layer includes: polyvinyl alcohol (PVA).

In some embodiments, when the polarizing layer is multiplexed as a light-transmitting support layer, the material of the light-transmitting support layer includes PVA.

In some embodiments, the glue material includes optical glue.

In some embodiments, the material of the reflective part includes a metal, for example.

Thus, resonance scattering may occur to the incident light on a metal surface.

In some embodiments, a material of the nanoparticles includes: silicon; and a material of the reflective part includes: silver.

In some embodiments, as shown in FIG. 2, the nanoparticles 6 in the depolarizing layer 5 have a plurality of particle sizes, the reflective part 7 covering the nanoparticles 6 with different particle sizes among the plurality of particle sizes respectively generates resonance scattering with light of different preset wavelength ranges.

In some embodiments, the depolarizing layer at least includes: a first nanoparticle, a second nanoparticle and a third nanoparticle; a diameter of the first nanoparticle is greater than a diameter of the second nanoparticle, and the diameter of the second nanoparticle is greater than a diameter of the third nanoparticle.

A thickness of the reflective part covering the third nanoparticle is greater than a thickness of the reflective part covering the second nanoparticle; the thickness of the reflective part covering the second nanoparticle is greater than a thickness of the reflective part covering the first nanoparticle.

The reflective part covering the first nanoparticle generates resonance scattering with red light; the reflective part covering the second nanoparticle generates resonance scattering with green light; and the reflective part covering the third nanoparticle generates resonance scattering with blue light.

According to the polarizer provided by the embodiments of the present disclosure, the depolarizing layer includes nanoparticles covered by a reflective part and resonantly scattering with red light, blue light and green light, respectively, so that the depolarizing layer can realize the resonance scattering effect in the visible light range and realize the depolarization of the visible light to obtain near-natural light.

In specific implementation, the first nanoparticle, the second nanoparticle and the third nanoparticle may include the same material, and the reflective part covering nanoparticles of different particle sizes may include the same material. Adjusting the diameter of the nanoparticles and the thickness of the reflective part can realize the resonance scattering of different nanoparticles covered by the reflective part with light of different wave bands, so as to realize the depolarization of linearly polarized light in the visible light range.

In specific implementation, a density of the nanoparticles covered by the reflective part may also be adjusted to realize the resonance scattering effect in the visible light range. In specific implementation, the particle size of the nanoparticles and the thickness of the reflective part may be adjusted according to actual needs, so as to realize the resonance scattering effect of the nanoparticles of different sizes covered by the reflective part with light in different wavelength ranges.

In some embodiments, a wavelength range of the red light scattered by the first nanoparticle covered by the reflective part is 620 nanometers (nm) to 700 nm; a wavelength range of the green light scattered by the second nanoparticle covered by the reflective part is 520 nm to 560 nm; and a wavelength range of the blue light scattered by the third nanoparticle covered by the reflective part is 445 nm to 500 nm.

In some embodiments, a particle size of the first nanoparticle is: 33 nanometers to 35 nanometers; the thickness of the reflective part covering the second nanoparticle is: 10 nanometers to 12 nanometers; a particle size of the second nanoparticle is: 21 nanometers to 23 nanometers; the thickness of the reflective part covering the second nanoparticle is: 14 nanometers to 17 nanometers; a particle size of the third nanoparticle is: 1 nanometer to 2 nanometers; the thickness of the reflective part covering the third nanoparticle is: 29 nanometers to 32 nanometers.

In some embodiments, the particle size of the first nanoparticle is 34.3 nm, and the thickness of the reflective part covering the first nanoparticle is 11.0 nm. The particle size of the second nanoparticle is 22.3 nm, and the thickness of the reflective part covering the second nanoparticle is 15.8 nm. The particle size of the third nanoparticle is 1.3 nm, and the thickness of the reflective part covering the third nanoparticle is 30.8 nm.

In some embodiments, the density of the nanoparticles covered by the reflective part may be, for example, $6 \times 10^9/cm^2$.

Figure 5:
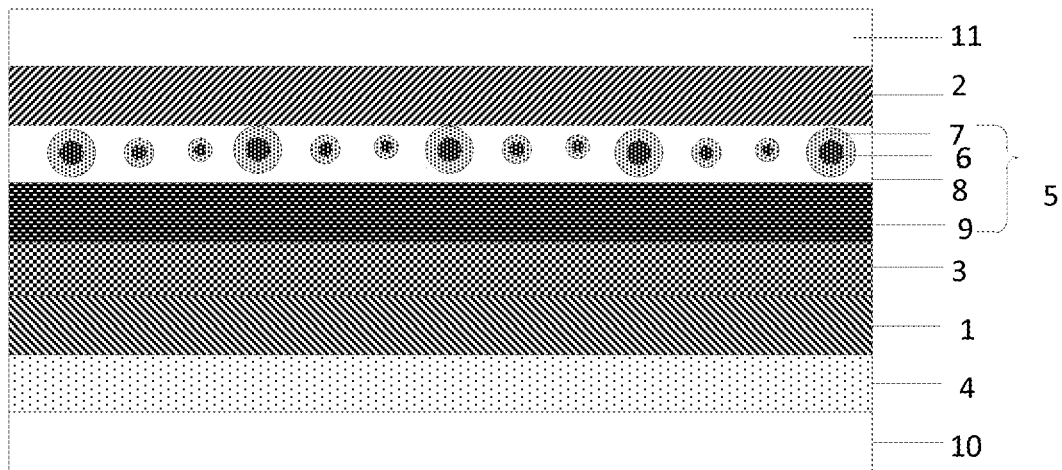
FIG. 5 is a schematic structural diagram of still another polarizer according to an embodiment of the present disclosure.
Figure 6:
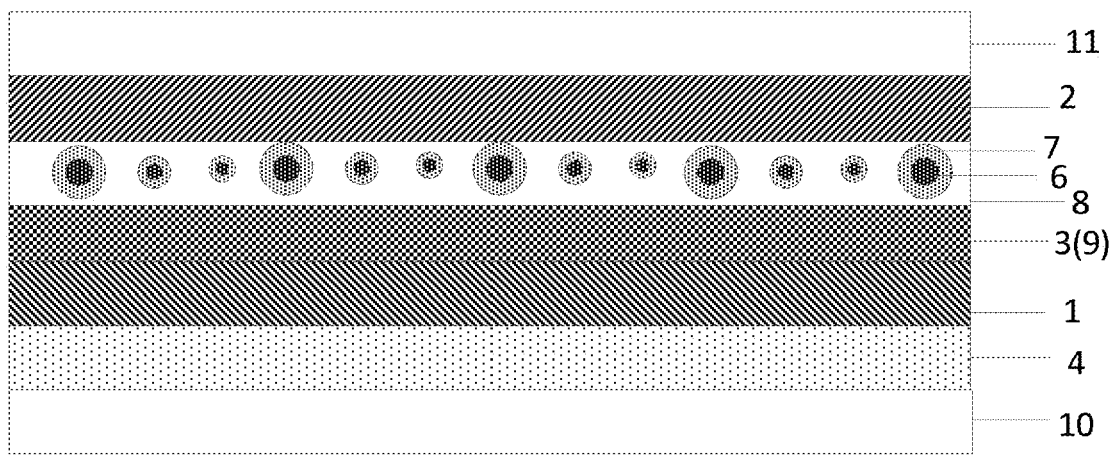
FIG. 6 is a schematic structural diagram of still another polarizer according to an embodiment of the present disclosure.

In some embodiments, as shown in FIGS. 5 and 6, the polarizer according to an embodiment of the present disclosure further includes: a release film 10 located on a side, facing away from the first protective layer 1, of the pressure-sensitive adhesive 4, and a protective film 11 located on a side, facing away from the polarizing layer 3, of the second protective layer 2. In specific implementation, the protective film 11 and the release film 10 may protect the polarizer, and may be waterproof and dustproof. When in use, the protective film and the release film may be ripped off.

Figure 7:
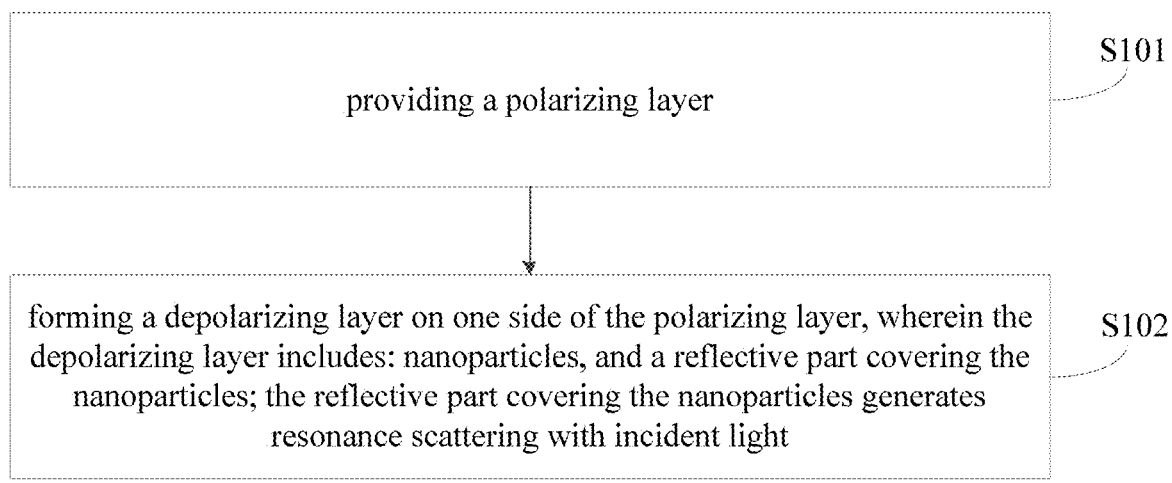
FIG. 7 is a schematic diagram of a preparation method of a polarizer according to an embodiment of the present disclosure.

On the basis of the same inventive concept, the embodiments of the present application further provide a preparation method of a polarizer, as shown in FIG. 7, including:

S101, providing a polarizing layer.

S102, forming a depolarizing layer on a light emitting side of the polarizing layer, wherein the depolarizing layer includes: nanoparticles, and a reflective part covering the nanoparticles; the reflective part covering the nanoparticles generates resonance scattering with incident light.

In the preparation method of the polarizer according to the embodiments of the present disclosure, the depolarizing layer is fabricated on the polarizing layer, and the depolarizing layer includes the nanoparticles covered by the reflective part. The nanoparticles may absorb light waves. When a photon frequency matches a natural oscillation frequency of electrons on a surface of the reflective part, plasma resonance will occur on the surface of the reflective part, resonance effect is generated, and resonance scattering occurs, so that polarized light may be depolarized to form near-natural light. Thus, a linear polarization degree of the light emitted from the polarizer is low. When the polarizer is applied to a display product and used as an upper polarizer of the display product, a linear polarization degree of the light emitted from the display product is low, and eye fatigue is not easily caused. In addition, since the linearly polarized light may be depolarized to form natural light, when the polarizer is applied to sunglasses for visual display, display color shift will not occur.

In some embodiments, S102 forming the depolarizing layer on a light emitting side of the polarizing layer specifically includes: providing a light-transmitting support layer; providing optical glue added with the nanoparticles covered by the reflective part, and coating the optical glue on a side, facing away from the polarizing layer, of the light-transmitting support layer; and attaching a side of the light-transmitting support layer, uncoated with the optical glue, to the polarizing layer.

In some embodiments, forming the depolarizing layer specifically includes: providing optical glue added with the nanoparticles covered by the reflective part; and using the polarizing layer as a light-transmitting support layer, and coating the optical glue on a side of the polarizing layer.

In the preparation method of the polarizer according to the embodiments of the present disclosure, the polarizing layer is used as a support layer of the glue material, so that a preparation process of the polarizer may be simplified, the structure of the polarizer may be simplified, and the cost may be reduced.

In some embodiments, before providing the polarizing layer, the method further includes: a first protective layer is provided, and a side of the first protective layer is coated with a pressure-sensitive adhesive; the polarizing layer is attached to a side, facing away from the pressure-sensitive adhesive, of the first protective layer.

Correspondingly, in some embodiments, attaching the light-transmitting support layer to a side of the polarizing layer specifically includes: the light-transmitting support layer is attached to the side of the polarizing layer away from the first protective layer.

Correspondingly, in some embodiments, coating a side of the polarizing layer with the optical glue specifically includes: a side, facing away from the first protective layer, of the polarizing layer is coated with the optical glue.

In some embodiments, after forming the depolarizing layer on a side of the polarizing layer, the method further includes: a second protective layer is attached to a side, facing away from the polarizing layer, of the depolarizing layer.

In some embodiments, before attaching the polarizing layer to a side, facing away from the pressure-sensitive adhesive, of the first protective layer, the method further includes: a release film is attached to a surface of the pressure-sensitive adhesive.

In some embodiments, after attaching the second protective layer, the method further includes: a protective film is attached to a side, facing away from the polarizing layer, of the second protective layer.

Figure 8:
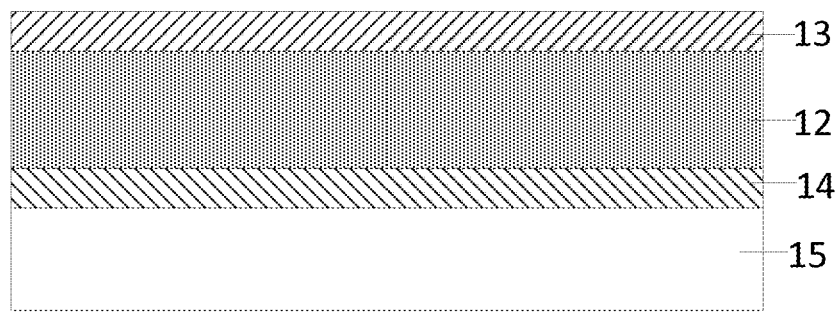
FIG. 8 is a schematic structural diagram of a display device according to an embodiment of the present disclosure.

On the basis of the same inventive concept, embodiments of the present disclosure further provides a display device, as shown in FIG. 8, including: a liquid crystal display panel 12, and a polarizer 13 located on a light emitting side of the liquid crystal display panel 12 according to the embodiments of the present disclosure.

The depolarizing layer in the polarizer 13 is located on a side, facing away from the liquid crystal display panel 12, of the polarizing layer.

The display device according to the embodiments of the present disclosure includes the polarizer with a depolarization function according to the embodiments of the present disclosure, and the polarizer with the depolarization function is located on the light emitting side of the liquid crystal display panel, i.e., as an upper polarizer, so that the linearly polarized light emitted by the liquid crystal display panel may be depolarized to obtain near-natural light, eye fatigue is not easily caused, healthy display may be realized, and when a display screen of the display device is viewed with polarized sunglasses, color shift is not prone to occurring.

In some embodiments, as shown in FIG. 8, the display device further includes a lower polarizer 14 on a side, facing away from the polarizer 13, of the liquid crystal display panel 12.

In some embodiments, as shown in FIG. 8, the display device further includes: a backlight module 15 on a side, facing away from the liquid crystal display panel 12, of the lower polarizer 14.

In some embodiments, the display device further includes polarized glasses.

In some embodiments, the liquid crystal display panel includes an array substrate and a counter substrate that are arranged opposite to each other, and a liquid crystal layer located between the array substrate and the counter substrate.

Next, taking the polarizing layer multiplexed as a light-transmitting support layer as an example, an introduction is given to the test result of the display device including the polarizer according to the embodiments of the present disclosure and a display device according to the related art in application to sunglasses display.

1. A test structure is as follows.

(1) Test objects: a display screen A, a display screen B, a display screen C and a display screen D.

The size of each display screen is 55 inches, and the display screen A includes a polarizer in which the polarizing layer provided in the embodiments of the present disclosure is multiplexed as the light-transmitting support layer. The display screen B includes a conventional polarizer in related art, and the conventional polarizer includes: a first protective layer, a second protective layer, a polarizing layer located between the first protective layer and the second protective layer, and a pressure-sensitive adhesive located on a side, facing away from the polarizing layer, of the first protective layer. The display screen C and the display screen D include a circular polarizer in the related art, and QWP in the circular polarizer is between the second protective layer and the polarizing layer. The display screen C includes a circular polarizer a, having a surface substrate thereof treated with 2% anti-glare (AG). The display screen D includes a circular polarizer b, having a surface substrate thereof with hard coat (HC).

(2) Test light source selection: a white light backlight source.

(3) Polarized sunglasses lens parameters: a transmission axis is 90°, and a transmittance of about 14%.

(4) Test device: a light chromaticity tester CA310.

2. A test method is as follows.

The display screen A, the display screen B, the display screen C and the display screen D are respectively integrated with the white light backlight source; the polarized sunglasses lens is fixed in front of the test lens of the light chromaticity tester CA310, and the polarized sunglasses lens is rotated counterclockwise to test the brightness and color coordinates of each display screen under different rotation angles. In the initial state, the transmission axis of the polarized sunglasses is parallel to a 90° direction of a transmission axis of the QWP.

3. The test results are as follows.

(1) Polarization degree: a polarization degree of the display screen A is 17.26%, a polarization degree of the display screen B is 98.3%, a polarization degree of the display screen C is 14.4%, and a polarization degree of the display screen D is 38.5%, that is, the polarization degree of the display screen C<the polarization degree of the display screen A<the polarization degree of the display screen D<the polarization degree of the display screen B.

The polarization degree represents the conversion rate of linearly polarized light. For example, after a beam of light enters and passes through a conventional linear polarizer, 98.3% of the light is converted into linearly polarized light, and the polarization degree is 98.3%. The smaller the polarization degree, the closer the light passing through the polarizer is to natural light; and the greater the polarization degree, the closer to linearly polarized light.

Figure 9:
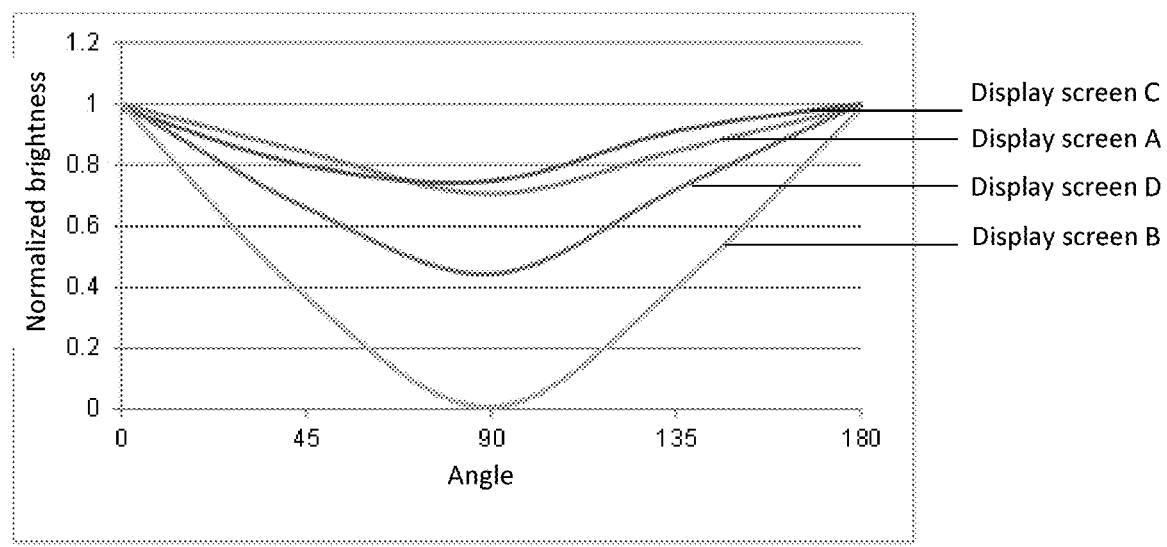
FIG. 9 is a schematic diagram illustrating brightness changes for different display screens by rotating sunglasses according to an embodiment of the present disclosure.

(2) Brightness change: rotating the sunglasses lens, the brightness changes of different display screens are shown in FIG. 9. The brightness change of the display screen A is 29.4%, the brightness change of display screen B is 99.1%, the brightness change of display screen C is 23.5%, and the brightness change of display screen D is 55.6%, that is, the brightness change of the display screen C<the brightness change of the display screen A<the brightness change of the display screen D<the brightness change of the display screen B.

When the brightness change is tested, the polarized sunglasses lens is rotated by 0°-180°. When a rotation angle is 0°, the brightness of each display screen is at the maximum; and when the rotation angle is 90°, the brightness of each display screen is at the minimum. The brightness of the display screen B is almost 0 when the rotation angle is 90°, and the black state appears. At this time, the transmission axis of the polarized sunglasses is perpendicular to a transmission axis of the conventional polarizer, and almost no light passes through. The brightness of the display screen D decreases by 55.6% when the rotation angle is 90°, and the human eye can clearly feel the brightness change when viewing through the sunglasses. When the rotation angle of the display screen C and the display screen A is 90°, the brightness change trend is small, and the brightness change is almost imperceptible to the human eye through the sunglasses.

Figure 10:
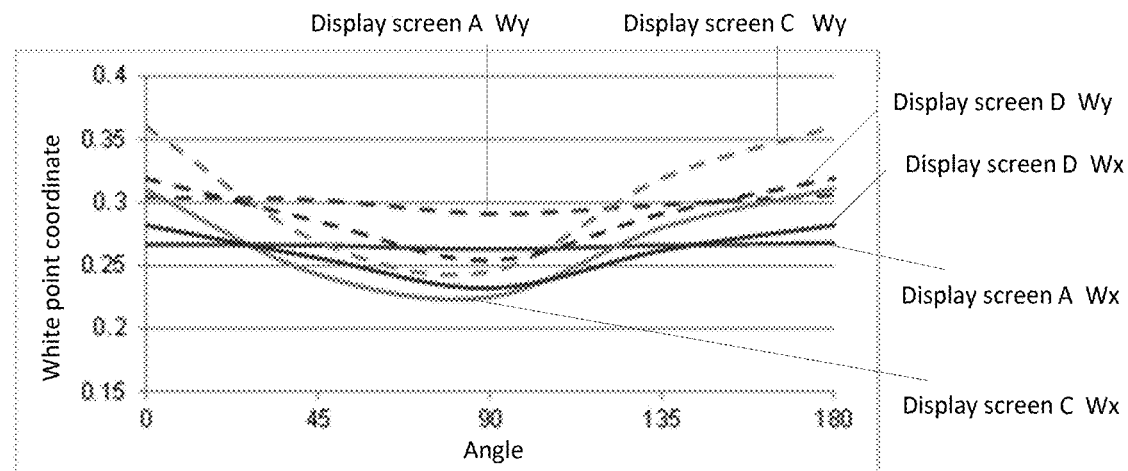
FIG. 10 is a schematic diagram illustrating change trends of the chromaticity for different display screens by rotating sunglasses according to an embodiment of the present disclosure.

(3) Chromaticity changes of the display screen A, the display screen C and the display screen D: rotating the polarized sunglasses lens, the change trends of the chromaticity of different display screens are shown in FIG. 10. The white point coordinate transformation of the display screen A is: $^{\Delta}Wx=0.004$, $^{\Delta}Wy=0.013$; the white point coordinate transformation of the display screen C is: $^{\Delta}Wx=0.085$, $^{\Delta}Wy=0.115$; and the white point coordinate transformation of the display screen D is: $^{\Delta}Wx=0.05$, $^{\Delta}Wy=0.065$; that is, the white point coordinate transformation of the display screen A<the white point coordinate transformation of the display screen D<the white point coordinate transformation of the display screen C. Wx is the white point coordinate x value, and Wy is the white point coordinate y value.

According to the color shift judgment standard: $^{\Delta}Wx<\pm 0.03$, $^{\Delta}Wy<\pm 0.03$, the color shift specifications of the display screen C and the display screen D are seriously beyond the standard, and the color shift specifications of the display screen A are within the standard range.

When the rotation angle of the polarized sunglasses lens is from 0° to 90°, the white point coordinates of the display screen C and the display screen D appear obvious drift phenomenon. The white point coordinates when the rotation angle of the polarized sunglasses lens is 90° are reduced in coordinate values, that is, blue-shifted coordinates, as compared with the white point coordinates when the rotation angle of the polarized sunglasses lens is 0°. Under different rotation angles of the polarized sunglasses lenses, the human eye can clearly observe the color shift phenomenon on the display screen C and the display screen D; and the display screen A has no color change under each view.

Figure 11:
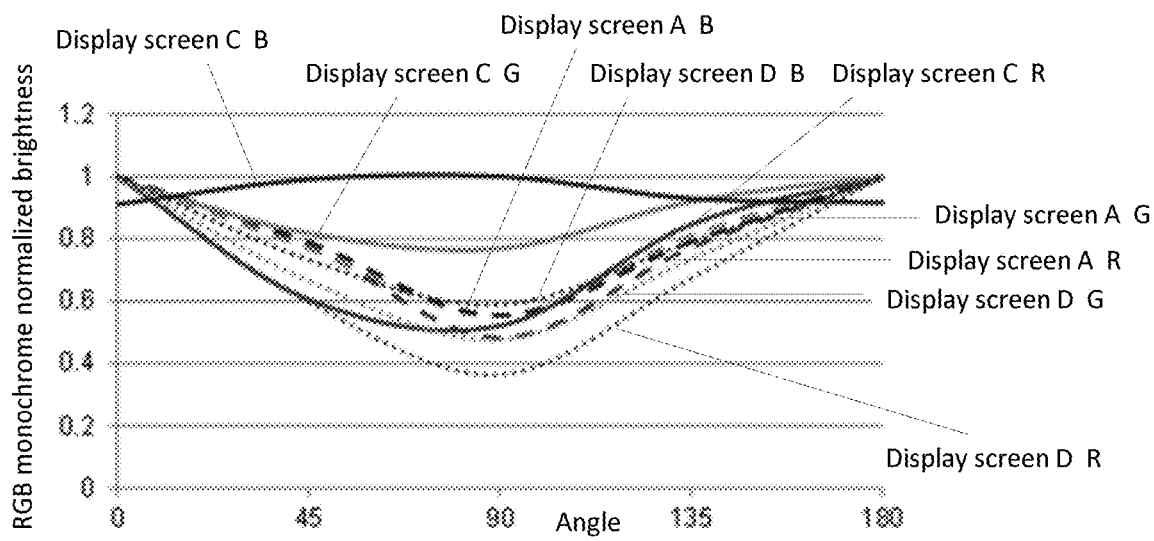
FIG. 11 is a schematic diagram illustrating change trends of the monochromatic light brightness for different display screens by rotating sunglasses according to an embodiment of the present disclosure.

(4) Monochromatic brightness changes of the display screen A, the display screen C and the display screen D: rotating the sunglasses, the change trends of monochromatic brightness of different display screens are shown in FIG. 11. For the display screen C and the display screen D, the transmission ratio of monochromatic light after passing through the QWP in the display screen changes, and the transmission ratio is blue light (B)>green light (G)>red light (R). The light intensity of the monochromatic light R, G, B transmitting through the display screen A is consistent in ratio.

4. The test results are analyzed as follows.

(1) Display screen B: the upper polarizer in the display screen B is a conventional polarizer. Both the polarizer and polarized sunglasses are linear polarizers. The brightness is the highest when a transmission axes of the polarizer is parallel to a transmission axes of the polarized sunglasses, and the brightness is zero when the transmission axes of the polarizer is vertical to the transmission axes of the polarized sunglasses, a black state appears, and the screen is invisible.

(2) Display screen C and display screen D: after the incident light of the backlight source passes through the polarized sunglasses lenses with different transmission axes, the white point coordinates are severely shifted. The main reason is the affect from QWP. The QWP is selective to the optical rotation band of the incident light, and can only convert light of a specific wavelength into circularly polarized light, and light of other wavelength bands into elliptically polarized light. The transmission ratio of monochromatic light after passing through the QWP changes, the transmission ratio of blue light, green light and red light is: blue light>green light>red light. That is to say, the optical rotation efficiency of QWP for short-wave blue light is high or similar to circularly polarized light. As the wavelength becomes longer, the optical rotation efficiency decreases, and the elliptical polarization increases.

(3) Display screen A: the upper polarizer of the display screen A is the polarizer with the depolarization function according to the embodiments of the present disclosure. The linearly polarized light can be depolarized by the resonance scattering of the nanoparticles covered by the reflective part. After the incident light transmits through the display screen A and passes through the polarized sunglasses lens, the brightness changes slightly, and there is no color shift problem. In addition, the light intensity of the monochromatic light R, G, B transmitting through the display screen A is consistent in ratio. After passing through polarized sunglasses lenses with different transmission axes, the ratio of R, G, and B changes slightly, and the white point coordinates hardly change, that is, there is no color shift defect.

According to the above test results, it can be seen that the display screen B using the conventional linear polarizer as the upper polarizer is not suitable for sunglasses free display due to the black state. The display screen C and the display screen D that use the circular polarizer as the upper polarizer have serious color shift and are not suitable for sunglasses free display. The display screen A that uses the polarizer according to the embodiments of the present disclosure as the upper polarizer can be matched with polarized sunglasses with any transmission axis, has little brightness change and no color shift, and is suitable for sunglasses free display.

The display device according to the embodiments of the present disclosure is any product or component with a display function, such as a mobile phone, a tablet personal computer, a television, a display, a notebook computer, a digital photo frame, and a navigator. Other indispensable components of the display device are understood by a person of ordinary skill in the art, and will not be repeated here, nor should they be used as a limitation to the present disclosure.

In summary, the embodiments of the present disclosure provide a polarizer and a preparation method thereof and a display device, wherein the polarizer includes a depolarizing layer, and the depolarizing layer includes nanoparticles covered by a reflective part. The nanoparticles can absorb light waves. When the photon frequency matches the natural oscillation frequency of electrons on a surface of the reflective part, plasma resonance will occur on the surface of the reflective part, resonance effect is generated, and resonance scattering occurs, so that polarized light can be depolarized to form near-natural light. Thus, the linear polarization degree of the light emitted from the polarizer is low. When the polarizer is applied to a display product and used as an upper polarizer of the display product, the linear polarization degree of the light emitted from the display product is low, and eye fatigue is not easily caused. In addition, since the linearly polarized light can be depolarized to form natural light, when the polarizer is applied to sunglasses for visual display, display color shift will not occur.

Obviously, a person skilled in the art can make various modifications and variations to the present disclosure without departing from the spirit and scope of the present disclosure. In the case, if these modifications and variations of the present disclosure fall within the scope of the claims of the present disclosure and their equivalent art, the present disclosure also intends to include these modifications and variations.

What is claimed is:

1. A polarizer, comprising:
  a polarizing layer; and
  a depolarizing layer on a light emitting side of the polarizing layer;
  wherein the depolarizing layer comprises:
    nanoparticles; and
    a reflective part covering the nanoparticles;
    wherein the reflective part covering the nanoparticles generates resonance scattering with incident light.

2. The polarizer according to claim 1, wherein the depolarizing layer further comprises:
  a glue material;
  wherein the nanoparticles covered by the reflective part are dispersed in the glue material.

3. The polarizer according to claim 2, wherein the depolarizing layer further comprises:
  a light-transmitting support layer;
  wherein the glue material is on a side, facing away from the polarizing layer, of the light-transmitting support layer.

4. The polarizer according to claim 2, wherein the depolarizing layer further comprises:
  a light-transmitting support layer;
  wherein the polarizing layer is multiplexed as the light-transmitting support layer, and the glue material is on the light emitting side of the polarizing layer.

5. The polarizer according to claim 2, wherein the glue material comprises optical glue.

6. The polarizer according to claim 1, wherein:
a material of the nanoparticles comprises silicon; and
a material of the reflective part comprises silver.

7. The polarizer according to claim 1, wherein:
the nanoparticles in the depolarizing layer are provided with a plurality of particle sizes; and
the reflective part covering nanoparticles with different particle sizes among the plurality of particle sizes respectively generates resonance scattering with light of different preset wavelength ranges.

8. The polarizer according to claim 7, wherein the depolarizing layer at least comprises: a first nanoparticle, a second nanoparticle and a third nanoparticle;
a diameter of the first nanoparticle is greater than a diameter of the second nanoparticle, and the diameter of the second nanoparticle is greater than a diameter of the third nanoparticle;
a thickness of the reflective part covering the third nanoparticle is greater than a thickness of the reflective part covering the second nanoparticle;
the thickness of the reflective part covering the second nanoparticle is greater than a thickness of the reflective part covering the first nanoparticle;
the reflective part covering the first nanoparticle generates resonance scattering with red light;
the reflective part covering the second nanoparticle generates resonance scattering with green light; and
the reflective part covering the third nanoparticle generates resonance scattering with blue light.

9. The polarizer according to claim 8, wherein:
a particle size of the first nanoparticle is: 33 nanometers to 35 nanometers; the thickness of the reflective part covering the second nanoparticle is: 10 nanometers to 12 nanometers;
a particle size of the second nanoparticle is: 21 nanometers to 23 nanometers; the thickness of the reflective part covering the second nanoparticle is: 14 nanometers to 17 nanometers;
a particle size of the third nanoparticle is: 1 nanometer to 2 nanometers; the thickness of the reflective part covering the third nanoparticle is: 29 nanometers to 32 nanometers.

10. The polarizer according to claim 1, wherein the polarizer further comprises: a first protective layer and a second protective layer;
the first protective layer is on a side, facing away from the depolarizing layer, of the polarizing layer;
the second protective layer is on a side, facing away from the polarizing layer, of the depolarizing layer.

11. A method for preparing a polarizer, comprising:
providing a polarizing layer; and
forming a depolarizing layer on a light emitting side of the polarizing layer;
wherein the depolarizing layer comprises: nanoparticles, and a reflective part covering the nanoparticles; and the reflective part covering the nanoparticles generates resonance scattering with incident light.

12. The method according to claim 11, wherein said forming the depolarizing layer on the light emitting side of the polarizing layer comprises:
providing a light-transmitting support layer;
providing optical glue added with the nanoparticles covered by the reflective part, and coating the optical glue on a side, facing away from the polarizing layer, of the light-transmitting support layer; and
attaching a side of the light-transmitting support layer, uncoated with the optical glue, to the polarizing layer.

13. The method according to claim 11, wherein said forming the depolarizing layer comprises:
providing optical glue added with the nanoparticles covered by the reflective part; and
using the polarizing layer as a light-transmitting support layer, and coating the optical glue on a side of the polarizing layer.

14. A display device, comprising:
a liquid crystal display panel, and
the polarizer according to claim 1 on a light emitting side of the liquid crystal display panel,
wherein the depolarizing layer in the polarizer is on a side, facing away from the liquid crystal display panel, of the polarizing layer.

15. The display device according to claim 14, further comprising polarized glasses.

* * * * *